United States Patent [19]

Moore

[11] Patent Number: 4,622,511
[45] Date of Patent: Nov. 11, 1986

[54] SWITCHING REGULATOR

[75] Inventor: Bruce D. Moore, Sunnyvale, Calif.

[73] Assignee: Raytheon Company, Lexington, Mass.

[21] Appl. No.: 718,624

[22] Filed: Apr. 1, 1985

[51] Int. Cl.$^4$ .............................................. G05F 1/44
[52] U.S. Cl. .................................. 323/282; 323/267; 323/272; 323/222; 363/21
[58] Field of Search .................. 363/21; 323/222, 267, 323/268, 271, 272, 282, 283; 307/18, 21, 29, 38

[56] References Cited

U.S. PATENT DOCUMENTS

| | | | |
|---|---|---|---|
| 3,743,924 | 7/1973 | Genuit et al. | 323/271 |
| 4,253,136 | 2/1981 | Nanko | 363/21 |
| 4,323,957 | 4/1982 | Clark, Jr. et al. | 363/21 |
| 4,395,675 | 7/1983 | Toumani | 323/282 X |
| 4,466,051 | 8/1984 | Fitzgerald | 363/21 |
| 4,510,564 | 4/1985 | Seer, Jr. | 323/267 X |

Primary Examiner—Patrick R. Salce
Assistant Examiner—Marc S. Hoff
Attorney, Agent, or Firm—Richard M. Sharkansky

[57] ABSTRACT

A switching regulator is provided for regulating voltages at a pair of output terminals. The regulator includes an inductor which is "time shared" in regulating the voltages at both terminals. During the first half of each period, the inductor is charged in accordance with the error in voltage at one terminal and then discharged to control the voltage at such terminal; and, during the second half of each period, the inductor is charged in accordance with the error in voltage at the second terminal and then discharged to control the voltage at the second terminal.

13 Claims, 10 Drawing Figures

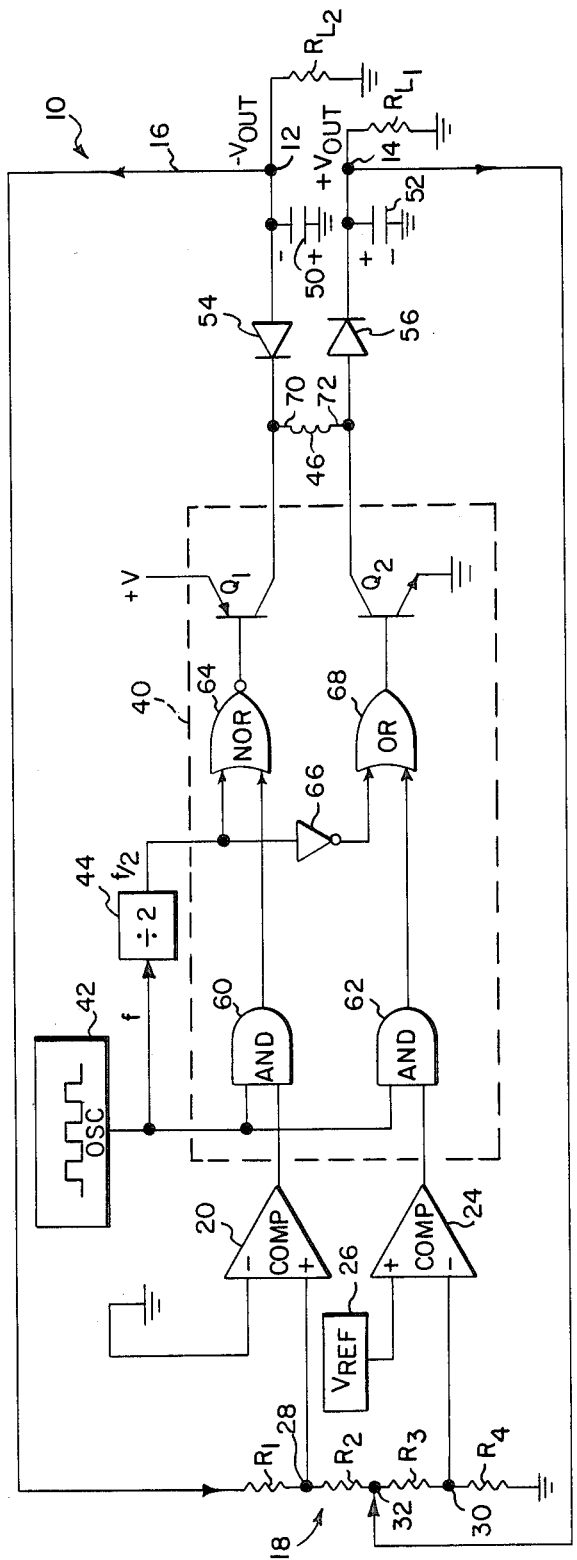
Fig.1
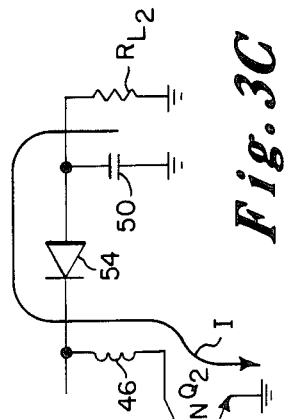
Fig.3C
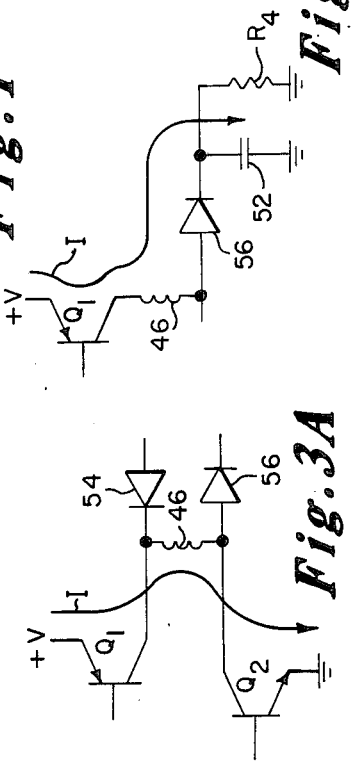
Fig.3B
Fig.3A

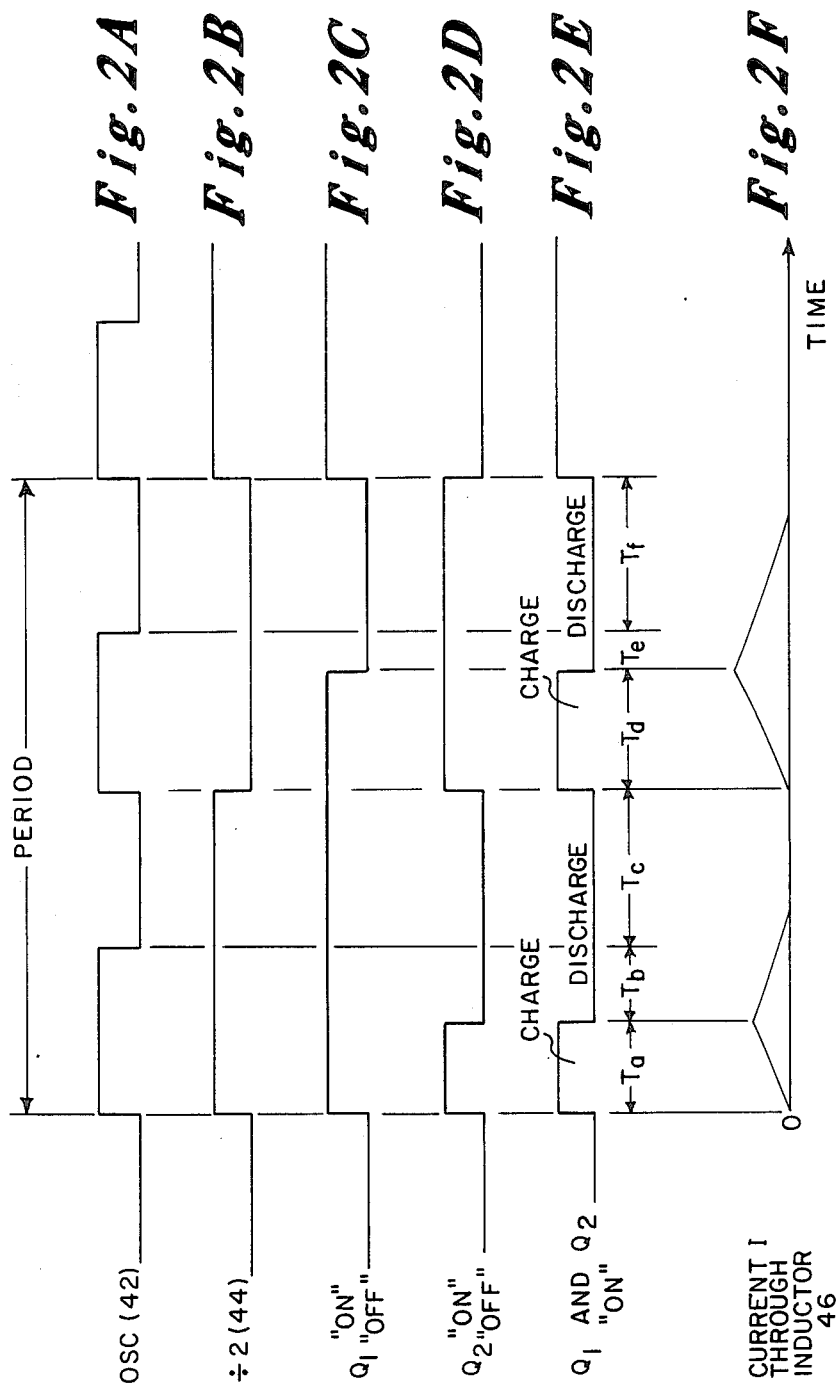

SWITCHING REGULATOR

BACKGROUND OF THE INVENTION

The invention relates generally to voltage regulators and more particularly to switching regulators used to control voltage levels at a pair of outputs.

As is known in the art, switching regulators are frequently used to control the voltage at an output thereof. In one such regulator, a feedback voltage is used to produce a control signal related to the difference between the actual voltage at the output and the desired output voltage. The regulator includes an oscillator for producing a train of pulses. The duty cycle of the train of pulses is controlled or modulated in accordance with the control signal to couple a voltage source to and from an inductor in accordance with the duty cycle. Thus, the inductor periodically stores an amount of energy related to the difference between the actual and desired output voltages during the portion of each period of the pulse train when such inductor is coupled to the supply. During the remaining portion of the period, i.e., when the inductor is decoupled from the supply, the energy stored in the inductor is directed to a capacitor connected in parallel with the output to raise the voltage on the capacitor until it reaches the desired voltage, as when the actual voltage is less than desired voltage; otherwise, the capacitor discharges to the load, as when the actual voltage is greater than the desired voltage. While such switching regulator is effective in controlling the voltage at a single output, it is sometimes desirable to control different voltages at correspondingly different outputs. One way to provide such dual control would be to use two regulators; however, such is costly.

SUMMARY OF THE INVENTION

In accordance with the present invention, a regulator is provided for regulating the level of signals at a plurality of outputs, comprising: an energy storing means; means for controlling energy to the energy storing means selectively in accordance with the levels of the signals relative to desired levels of such signals; and, means for directing the stored energy to the outputs to control the level of the signals. With such arrangement, a single energy storing means is used in regulating signals at a plurality of outputs.

In a preferred embodiment of the invention, the energy storing means is an inductor and the energy controlling means comprises: means for producing a train of pulses; and, means for modulating the time duration of each of the pulses in the train thereof selectively in accordance with the levels of the signals relative to the desired levels of such signals.

In accordance with a feature of the invention, the regulator includes: a pair of outputs, a first one thereof producing a voltage having a negative polarity relative to a reference potential and a second one thereof producing a voltage having a positive potential relative to the reference potential; and, means for coupling the inductor to a supply during a first portion of a first period of time relative to the difference between the level of the signal at the first output and a desired level of such signal and for decoupling such inductor from such supply during the remaining portion of the first period of time and for coupling the inductor to the supply during a first portion of a second period of time relative to the difference between the level of the signal at the second output and a desired level of such signal and for decoupling such inductor from such supply during the remaining portion of the second period. The directing means includes means for directing energy stored in the inductor during the first portion of the first period of time to a first capacitor coupled to the first output during the remaining portion of the first period of time and for directing energy stored in the inductor during the first portion of the second period of time to a second capacitor coupled to the second output during the remaining portion of the second period of time.

In a preferred embodiment of the invention, the coupling means includes a pair of transistors serially connected to the inductor and the supply and the directing means includes a pair of diodes coupled between the first and second outputs and the inductor.

BRIEF DESCRIPTION OF THE DRAWINGS

The foregoing features of the invention, as well as the invention itself, may be more fully understood from the following detailed description read together with the accompanying drawings, in which:

FIG. 1 is a schematic diagram of a switching regulator according to the invention;

FIGS. 2A-2F are sketches showing the time history of signals produced in the switching regulator of FIG. 1; and FIGS. 3A-3C are schematic diagrams of portions of the regulator of FIG. 1 and are useful in understanding the operation of such regulator.

DESCRIPTION OF THE PREFERRED EMBODIMENT

Referring now to FIG. 1, a switching regulator 10 is shown to control the voltage $-V_{out}$ produced at output terminal 12 and the voltage $+V_{out}$ produced at output terminal 14; the voltage $-V_{out}$ at terminal 12 being at a negative potential relative to ground and the voltage $+V_{out}$ at terminal 14 being at a positive potential relative to ground. The voltage $-V_{out}$ at output terminal 12 is fed back, via line 16 and a resistor voltage divider network 18, to the non-inverting (+) input of a voltage comparator 20, the inverting (−) input of such comparator being referenced to ground, as shown. In like manner, the voltage $+V_{out}$ at output terminal 14 is fed back, via line 22 and resistor voltage divider network 18, to the inverting (−) input of comparator 24, the non-inverting (+) input of comparator 24 being coupled to a voltage reference source 26, as shown.

The resistor voltage divider network 18 here includes four resistors, $R_1$, $R_2$, $R_3$ and $R_4$, serially coupled between line 16 and ground, as shown. The terminal 28 connecting resistors $R_1$ and $R_2$ is fed to the (+) input of comparator 20, and the terminal 30 connecting resistors $R_3$ and $R_4$ is connected to the (−) input of comparator 24, as shown. The terminal 32 connecting resistors $R_2$ and $R_3$ is coupled to output terminal 14 via line 22, as shown. The resistors $R_1$, $R_2$, $R_3$, $R_4$ are selected so that: (1) when the voltage $-V_{out}$ at output terminal 12 is equal to a predetermined desired voltage $(-V_1)$, the voltage at terminal 28 is at ground potential; and (2) when the voltage $+V_{out}$ is at a predetermined desired voltage $(+V_2)$, the voltage at terminal 30 is at $+V_{REF}$, where $+V_{REF}$ is the voltage produced by reference voltage source 26. More particularly, $V_{REF}$, $R_3$ and $R_4$ are selected so that is $+V_{out}$ (desired) and $R_1$ and $R_2$ are related so that $(R_1/R_2)(+V_{out}$ (desired)$) = -V_{out}$ (desired). Thus, a logic, or control, signal is produced at the output of comparator 20 related to the difference between $-V_{out}$ and $-V_1$; i.e., the difference between the actual voltage $-V_{out}$ at output terminal 12 and the desired output voltage $-V_1$ at such output terminal 12 and comparator 24 produces a logic or control signal related to the difference between $+V_{out}$ and $+V_2$; i.e., the difference between the actual voltage $+V_{out}$ at the output terminal 14 and the desired voltage $+V_2$ at such output terminal 14. Here the output of comparator 20 is "high" (a logical 1) when the voltage $-V_{out}$ at output terminal 12 is less negative than the desired voltage $-V_1$, i.e., when the magnitude of $-V_{out}$ is less than the magnitude of $-V_1$, that is $|-V_{out}| < |31 V_1|$) and such output is "low" (a logical 0) when the voltage $-V_{out}$ at terminal 12 is greater than (or equal to) the desired voltage $-V_1$, i.e., when the magnitude of $-V_{out}$ is equal to, or greater than, the magnitude of $-V_1$, that is $|-V_{out}| \geq |-V_1|$). Also, here the output of comparator 24 is "high" (a logical 1) when the voltage $+V_{out}$ at terminal 14 is less positive than the desired voltage $+V_2$, i.e., $+V_{out} < +V_2$ and such output is "low" (a logical 0) when the voltage $+V_{out}$ at terminal 14 is greater than (or equal to) the desired voltage $V_2$, i.e., $+V_{out} \geq +V_2$.

The logic, or control, signals produced by comparators 20, 24 are fed to a pulse width, or duty cycle, modulator section 40. Also fed to such modulator section 14 are: (1) a clock signal having a predetermined frequency f and a fifty percent duty cycle; such signal being produced by a conventional clock oscillator 42; and, (2) a signal having a frequency f/2 and a fifty percent duty cycle, such signal being produced by feeding the clock signal produced by oscillator 42 via a conventional divide by two frequency divider 44 (such as a flip/flop circuit). The modulator 40 is also coupled to a voltage supply +V and ground, as shown. The output of the modulator 40 is coupled to an energy storing means, here an inductor 46. The modulator 40 modulates the time duration of each of the pulses in the train thereof selectively in accordance with the control signals produced by comparators 20, 24 (and hence in accordance with the levels of the signals $-V_{out}$, $+V_{out}$ at output terminals 12, 14 relative to the desired signals $-V_1$, $+V_2$), each one of such modulated pulse operating to couple the inductor 46 serially between the voltage supply +V and ground. Thus, the inductor stores in the magnetic field thereof an amount of energy related to the time duration of the pulse and hence an amount of energy related to the difference between $-V_{out}$ and $-V_1$ and $+V_{out}$ and $+V_2$. This stored energy is directed to capacitors 50, 52 coupled between ground and output terminals 12, 14, respectively, as shown via diodes 54, 56, respectively, as shown.

More specifically, and referring also to FIGS. 2A-2F, the time history of FIG. 2A shows the waveform produced by oscillator 42 and the time history of FIG. 2B shows the the waveform produced by the divide by two network 44. The signal produced by oscillator 42 is fed to inputs of AND gates 60, 62, as shown. The outputs of comparators 20, 24 are fed to input of AND gates 60, 62, respectively, as shown. The output of the divide by two network 44 is fed directly to NOR gate 64 and through inverter 66 to OR gate 68, as shown. The outputs of AND gates 60, 62 are coupled to NOR gate 64 and OR gate 68, respectively, as shown. The outputs of NOR gate 64 and OR gate 68 are fed to the base electrodes of transistors $Q_1$, $Q_2$, respectively, as shown. Transistor $Q_1$, here a PNP transistor, has its emitter coupled to the +V supply and its collector connected to a first end 70 of inductor 46 and also to the cathode of diode 54, as shown. Transistor $Q_2$, here an NPN transistor, has its emitter connected to ground and its collector connected to the second end 72 of inductor 46 and also to the anode of diode 56, as shown. FIG. 2C shows the "on"/"off" states of transistor $Q_1$ and FIG. 2D shows the "on"/"off" states of transistor $Q_2$. Thus, it is first noted that if each period T of operation of regulator 10 is considered as the period of the signal produced by the divide by two network 44, it is first noted that during the entire first half of such period, transistor $Q_1$ is biased towards conduction because during such first half period the output of the divide by two network 44 is "high" and hence NOR gate 64 will produce a "low" voltage at the base of transistor $Q_1$ regardless of the state of AND gate 60. Likewise, during the second half of the period transistor $Q_2$ is biased towards conduction because during the second half of the period the output of the divide by two network is "low"; however, inverter 66 converts this "low" signal to a "high" signal to thereby bias transistor $Q_2$ towards conduction. Thus, during the first half of each period, transistor $Q_1$ is biased towards conduction and during the second half of each period, transistor $Q_2$ is biased towards conduction regardless of the signals produced by caparators 20, 24.

Considering first the condition when the voltage $+V_{out}$ at terminal 12 is less positive than the desired voltage $+V_2$, the output of comparator 24 goes "high" as noted above. Since during the first quarter of the period (shown in FIG. A) the output of oscillator 42 is "high" AND gate 62 produces a "high" signal. Thus, the output of OR gate 68 goes "high" even though the output of inverter 66 is "low" during the first quarter of the period. The "high" signal produced by OR gate 68 biases transistor $Q_2$ towards conduction. Since, as noted above, transistor $Q_1$ is biased towards conduction during the entire first half of the period, current flows from +V through transistor $Q_1$, through inductor 46, through transistor $Q_2$, to ground, as shown in FIG. 3A. The current passing through the inductor 46 (as shown in FIGS. 3E and 3F) results in the inductor 46 storing energy in its magnetic field. During the next, or second, quarter of the period, the output of oscillator 42 goes "low" so that the output of AND gate 62 goes "low". Since the output of inverter 66 is also "low", the output of OR gate 68 goes "low" with the result that transistor $Q_2$ is placed in a non-conducting state. The energy stored in the inductor 46 during the first quarter of the period is directed, via diode 56, to capacitor 52, as shown in FIG. 3B, with the transferred energy thus increasing the voltage positively across the capacitor 52 and hence increasing positively, the voltage at terminal 14. (It is noted that a complete circuit exists between +V, transistor $Q_1$, inductor 46, diode 56, capacitor 52 and ground. In the steady state, the "on" time of transistor $Q_2$ during the first quarter of the period is related to the difference between the voltage $+V_{out}$ at terminal 14 and the desired voltage $+V_2$; when both are equal, transistor $Q_2$ remains "off" during the entire first quarter of the period. In any event, in the general case, if the first quarter period is the sum of the true intervals $T_a$ and $T_b$, as shown in FIG. 2D, the transistor $Q_2$ is "on" for time interval $T_a$, it is during the interval $T_a$ that the inductor 46 is "charged", i.e., passes current, as shown in FIG. 3A and such inductor 46 is "discharged" of such "charge" during the remaining interval $T_b$ of the first quarter period and during the second quarter of the period, i.e., the interval $T_c$. Thus, $T_a/T_b$ is a function of the difference between $+V_{out}$ and $+V_2$. In the event that the voltage $+V_{out}$ is more positive than the desired voltage $+V_2$, transistor $Q_2$ remains "off" during the interval $T_a$ and capacitor 52 discharges to load $R_{L1}$ connected between ground and terminal 14. Thus, the capacitor 52 is either: receiving energy from the inductor 46, as when $+V_{out} < +V_2$; or, discharging stored energy to load $R_{L1}$, as when $+V_{out} > +V_2$.

Considering next control of the voltage $-V_{out}$ at terminal 12, as noted above, transistor $Q_2$ is biased towards conduction during the second half of the period. Thus, if the voltage $-V_{out}$ is less negative than the desired voltage $-V_1$, the output of capacitor 20 goes "high", as noted above since the output of oscillator 42 is "high" during the third greater of the period (FIG. 2B) AND gate 60 produces a "high" with the result that NOR gate 64 goes "low" to also bias transistor $Q_1$ towards conduction. Thus, as shown in FIG. 3A, transistors $Q_1$ and $Q_2$ are biased to conduct with the result that current passes from $+V$, through transistor $Q_1$, through inductor 46, through transistor $Q_2$, to ground to "charge" such conductor as shown for period $T_d$ in FIGS. 2E and 2F. During the last quarter of the period, the output of oscillator 42 goes "low" with the result that the output of NOR gate 64 goes "high" to bias "off" transistor $Q_1$ with the result that the energy (i.e., back E.M.F.) produced by the inductor 46 causes a current to flow, as in FIG. 3C, from ground through capacitor 50, through diode 54, through inductor 46, through conducting transistor $Q_2$, back to ground thus charging capacitor 50, i.e., increasing negatively the voltage at terminal 12. In the steady state, the "on" time of transistor $Q_1$ is related to the difference between the voltage $-V_{out}$ at terminal 12 and the desired voltage $-V_1$; when both are equal, transistor $Q_1$ remains "off" during the entire third quarter of the period. In any event, in the general case, if transistor $Q_1$ is "on" for time interval $T_d$, it is during the interval $T_d$ that the inductor is "charged" (i.e., passes current) as shown in FIG. 3A, and such inductor 46 46 is "discharged" of such "charge" during the remaining interval $T_e$ of the third quarter of the period (when the third quarter of the period is the sum of the intervals $T_d$ and $T_e$) and during the fourth quarter of the interval $T_f$. Thus, $T_d/T_e$ is a function of the difference between $-V_{out}$ and $-V_1$. In the event that the voltage $-V_{out}$ is more negative than the desired voltage $-V_1$, transistor $Q_1$ remains "off" during the interval $T_d$ and capacitor 50 discharges to load $R_{L2}$ connected between ground and terminal 12. Thus, the capacitor 50 either receives energy from conductor 46, as when $|-V_{out}| < |-V_1|$; or, discharges energy to load $R_{L1}$, as when $|-V_{out}| > |-V_1|$.

Thus, referring to FIG. 1 and FIGS. 2A–2F, it is noted that the inductor 46 is "time shared" in regulating the voltages at both terminals 12 and 14. During the first half of each period, the inductor 46 is charged in accordance with the error in voltage at terminal 14 and then discharged to control the voltage at terminal 14; and, during the second half of each period, the inductor 46 is charged in accordance with the error in voltage at terminal 12 and then discharged to control the voltage at terminal 12.

Having described a preferred embodiment of the invention, it is now evident that other embodiments incorporating these concepts may be used. It is felt, therefore, that this invention should not be restricted to the disclosed embodiment but rather should be limited only by the spirit and scope of the appended claims.

What is claimed is:

1. A switching regulator for regulating voltages at a pair of output terminals, such regulator comprising: an inductor; and, means operative during a first poriton of each of a series of periods for charging the inductor in accordance with an error in voltage at a first one of the pair of terminals and then discharging such inductor to control the voltage at such first one of the pair of terminals, and, operative during a second portion of each of such series of periods to charge the inductor in accordance with an error in voltage at the second one of the pair of terminals and then discharge such inductor to control the voltage at the second one of the pair of terminals.

2. A regulator for regulating the level of signals at a plurality of outputs, comprising:

an energy storing means;

means operable during a first time period for controlling energy to the energy storing means during the first time period in accordance with the level of the signal at a first one of the plurality of outputs relative to a desired level of such first output signal, and operable during a second time period for controlling energy to the energy storing means in accordance with the level of the signal at a second one of the plurality of outputs relative to a desired level of such second output signal; and, means for directing the stored energy to the first output during the first tie period to control the level of the first output signal, and for directing the stored energy to the second output during the second time period to control the level of the second output signal.

3. The regulator recited in claim 2 wherein the energy storing means is an inductor and the energy controlling means comprises: means for producing a train of pluses; and, means for modulating the time duration of each of the pulses in the train thereof selectively in accordance with the levels of the signals relative to the desired levels of such signals.

4. The regulator recited in claim 2 wherein the regulator includes: a pair of outputs, a first one thereof producing a voltage having a negative polarity relative to a reference potential and a second one thereof producing a voltage having a positive potential relative to the reference potential.

5. The regulator recited in claim 2 wherein the energy storing means is an inductor and wherein the controlling means includes means for coupling the inductor to a supply during a first portion of a first period of time relative to the difference between the level of the signal at the first output and a desired level of such signal and for decoupling such inductor from such supply during the remaining portion of the first period of time and for coupling an the inductor to the supply during a first portion of a second period of time relative to the difference between the level of the signal at the second output and a desired level of such signal and for decoupling such inductor from such supply during the remaining portion of the second period.

6. The regulator recited in claim 5 wherein the directing means includes means for directing energy stored in the inductor during the first portion of the first period of time to a first capacitor coupled to the first output during the remaining portion of the first period of time and for directing energy stored in the inductor during the first portion of the second period of time to a second capacitor coupled to the second output during the remaining portion of the second period of time.

7. The regulator recited in claim 5 wherein the coupling means includes a pair of transistors serially connected to the inductor and the supply and the directing means includes a pair of diodes coupled between the first and second outputs and the inductor.

8. The regulator recited in claim 6 wherein the coupling means includes a pair of transistors serially connected to the inductor and the supply and the directing means includes a pair of diodes coupled between the first and second outputs and the inductor.

9. A regulator for regulating the level of signals at a plurality of outputs, comprising:

an energy storing means;

means for controlling energy to the energy storing means selectively in accordance with the levels of the signals relative to desired levels of such signals, energy control means comprising: means for producing a train of pulses; and, means for modulating the time duration of each of the pulses in the train thereof selectively in accordance with the levels of the signals relative to the desired levels of such signals;

means for directing the stored energy to the outputs to control the level of the signals; and, a pair of outputs, a first one thereof producing a voltage having a negative polarity relative to a reference potential and a second one thereof producing a voltage having a positive potential relative to the reference potential.

10. The regulator recited in claim 9 wherein the energy storing means is an inductor and wherein the controlling means includes means for coupling the inductor to a supply during a first portion of a first period of time relative to the difference between the level of the signal at the first output and a desired level of such signal and for decoupling such inductor from such supply during the remaining portion of the first period of time and for coupling an inductor to the supply during a first portion of a second period of time relative to the difference between the level of the signal at the second output and a desired level of such signal and for decoupling such inductor from such supply during the remaining portion of the second period.

11. The regulator recited in claim 10 wherein the directing means includes means for directing energy stored in the inductor during the first portion of the first period of time to a first capacitor coupled to the first output during the remaining portion of the first period of time and for directing energy stored in the inductor during the first portion of the second period of time to a second capacitor coupled to the second output during the remaining portion of the second period of time.

12. The regulator recited in claim 10 wherein the coupling means includes a pair of transistors serially connected to the inductor and the supply and the directing means includes a pair of diodes coupled between the first and second outputs and the inductor.

13. The regulator recited in claim 9 wherein the energy storing means includes an inductor.

* * * * *